United States Patent
Abedigozalabad et al.

(10) Patent No.: US 12,254,027 B1
(45) Date of Patent: Mar. 18, 2025

(54) LEADERSHIP ELECTION IN CONSENSUS PROTOCOL WITH HETEROGENEOUS NODES

(71) Applicant: Oracle International Corporation, Redwood Shores, CA (US)

(72) Inventors: Saeed Abedigozalabad, San Mateo, CA (US); Thakur Vishwesh Singh, Karnataka (IN); Vijay Sridharan, Santa Clara, CA (US); Nilesh Choudhury, Redwood City, CA (US); Mehrnoosh Raoufi, Pittsburgh, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/607,314

(22) Filed: Mar. 15, 2024

(51) Int. Cl.
  *G06F 16/27*  (2019.01)

(52) U.S. Cl.
  CPC .................................. *G06F 16/27* (2019.01)

(58) Field of Classification Search
  None
  See application file for complete search history.

(56) References Cited

U.S. PATENT DOCUMENTS

| | | | |
|---|---|---|---|
| 2020/0028901 A1* | 1/2020 | Suresh | H04L 41/12 |
| 2024/0118905 A1* | 4/2024 | Kondiles | G06F 9/442 |

FOREIGN PATENT DOCUMENTS

| | | | |
|---|---|---|---|
| CN | 115277719 A | * | 11/2022 |
| CN | 116647441 A | * | 8/2023 |
| WO | WO-2024008156 A1 | * | 1/2024 |

OTHER PUBLICATIONS

English Machine Translation of WO-2024008156-A1 (Year: 2024).*
English Machine Translation of CN-116647441-A (Year: 2023).*
English Machine Translation of CN-115277719-A (Year: 2022).*

* cited by examiner

*Primary Examiner* — Eddy Cheung
(74) *Attorney, Agent, or Firm* — Hickman Becker Bingham Ledesma LLP; Stephen R. Tkacs

(57) ABSTRACT

The illustrative embodiments provide a consensus protocol with a priority-based leadership election approach. Each server or node in the cluster has an associated priority based on the capabilities and capacities of the servers. The leadership election is divided into two phases: a term increase phase and an election voting phase. A candidate sends a message to peers in the cluster to determine whether all peers agree to allow the candidate to increase the term number. If there is no opposition, then the candidate increases the term number and then proceeds to the election voting phase. Each peer determines whether the candidate requesting the term increase has a log that is up to date. If the log of the candidate is equally as advanced as the peer's log, then the peer approves or opposes the term increase based on a priority comparison.

30 Claims, 7 Drawing Sheets

| PRIORITY | |
|---|---|
| Server | Priority |
| S1 | 1 |
| S2 | 2 |
| S3 | 4 |
| S4 | 5 |
| S5 | 3 |

| NETWORK MONITOR | |
|---|---|
| Server | Status |
| S1 | up |
| S2 | up |
| S3 | up |
| S4 | down |
| S5 | up |

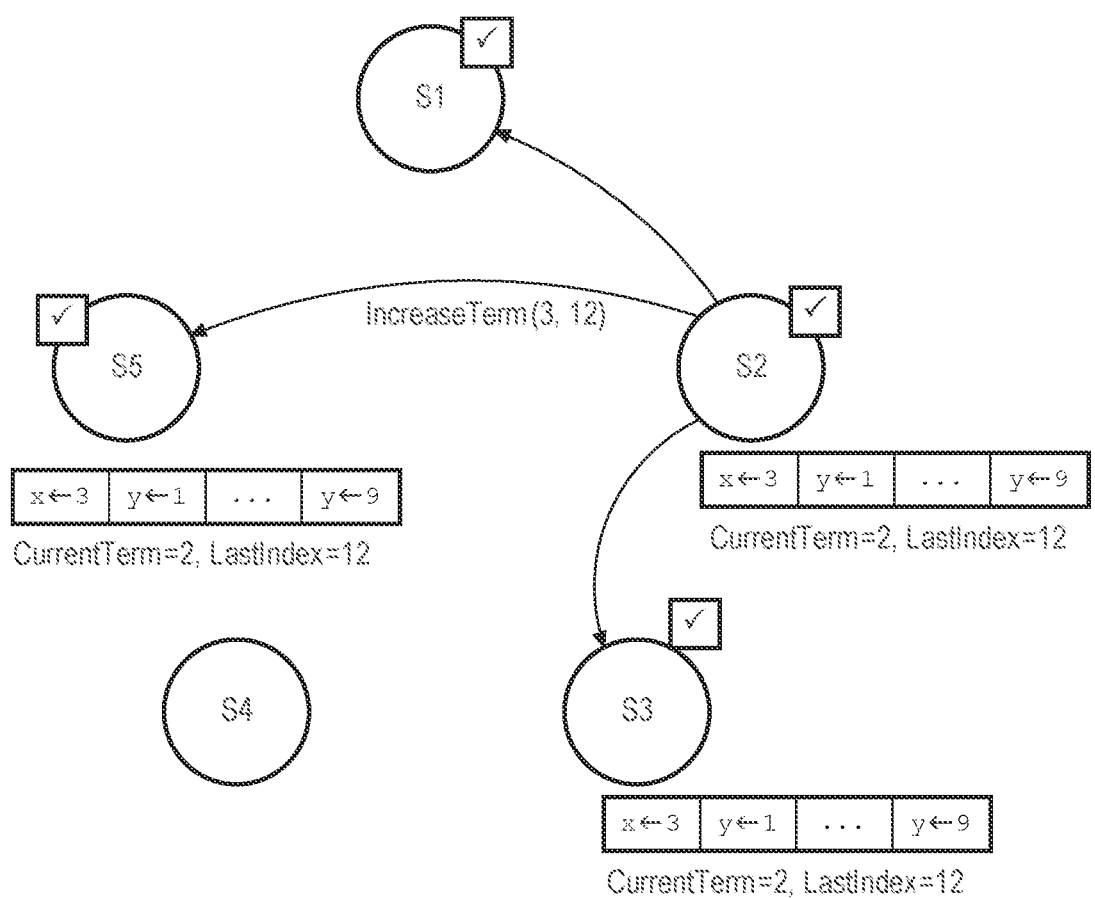

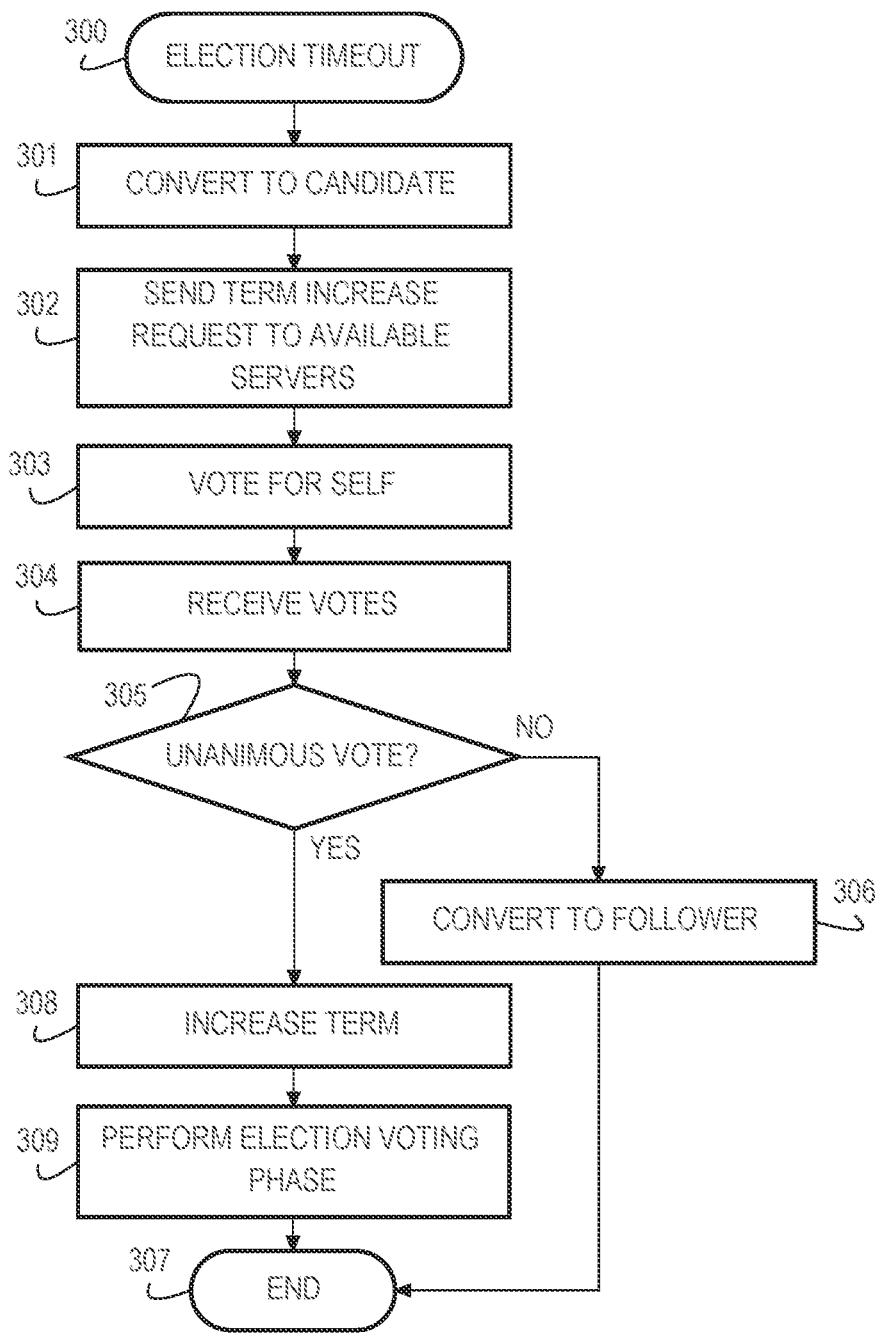

LEADERSHIP ELECTION IN CONSENSUS PROTOCOL WITH HETEROGENEOUS NODES

FIELD OF THE INVENTION

The present invention relates to managing leadership in a consensus protocol and, more particularly, to leadership election in a cluster with heterogeneous nodes.

BACKGROUND

Consensus protocols allow a collection of machines to work as a coherent group that can survive the failures of some of its members. Because of this, variations of consensus protocols play a key role in large-scale software systems, such as replicated database systems. Raft is a consensus protocol that is designed to be understandable and simple to implement. Raft offers a generic way to distribute a state machine, or object store, across a cluster of servers or computing nodes, ensuring that each server that is a member of the cluster agrees upon the same series of state transitions. The replicated state machines are typically implemented using a replicated log. Each server stores a log replica containing a series of commands, which its state machine executes in order; thus, each state machine processes the same sequence of commands. Since the state machines are deterministic, each computes the same state and the same sequence of outputs.

The Raft protocol divides time into terms of arbitrary length. Terms are numbered with consecutive integers. If a candidate wins an election, then it serves as leader for the rest of the term. The Raft protocol uses a heartbeat mechanism to trigger leader election. When servers start up, they begin as followers. Leaders send periodic heartbeats to all followers in order to maintain authority as leader. If a follower receives no communication over a period of time, referred to as the election timeout, then it assumes there is no viable leader and begins an election to choose a new leader. To begin the election, the follower increments its current term and transitions to candidate role. It then votes for itself and issues a vote request to each of the other servers in the cluster in parallel.

The Raft protocol assumes that the cluster is homogeneous. In other words, if multiple followers are up-to-date and the leader fails, then multiple followers have an equal opportunity to become leader. However, in many real-life environments, the servers may have different resources, such as processor cores, memory, storage, network bandwidth, etc. Some nodes can be faster than others, while other nodes can be more prone to failures. It is possible for the server with the least resources to become the leader, which can result in reduced performance of the entire cluster. Furthermore, in some situations, an election can result in a split vote. For example, in a cluster of five servers, if the leader fails, then two servers can vote for one leader and the other two remaining servers can vote for a different leader. Therefore, it would be beneficial to provide improved leadership elections in a consensus protocol with heterogeneous nodes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2D illustrates a successful term increase phase of a leadership election in a distributed computing system with heterogeneous servers in accordance with an illustrative embodiment.

FIG. 3 is a flowchart illustrating operation of a candidate performing a leadership election in accordance with an illustrative embodiment.

DETAILED DESCRIPTION

Figure 1:
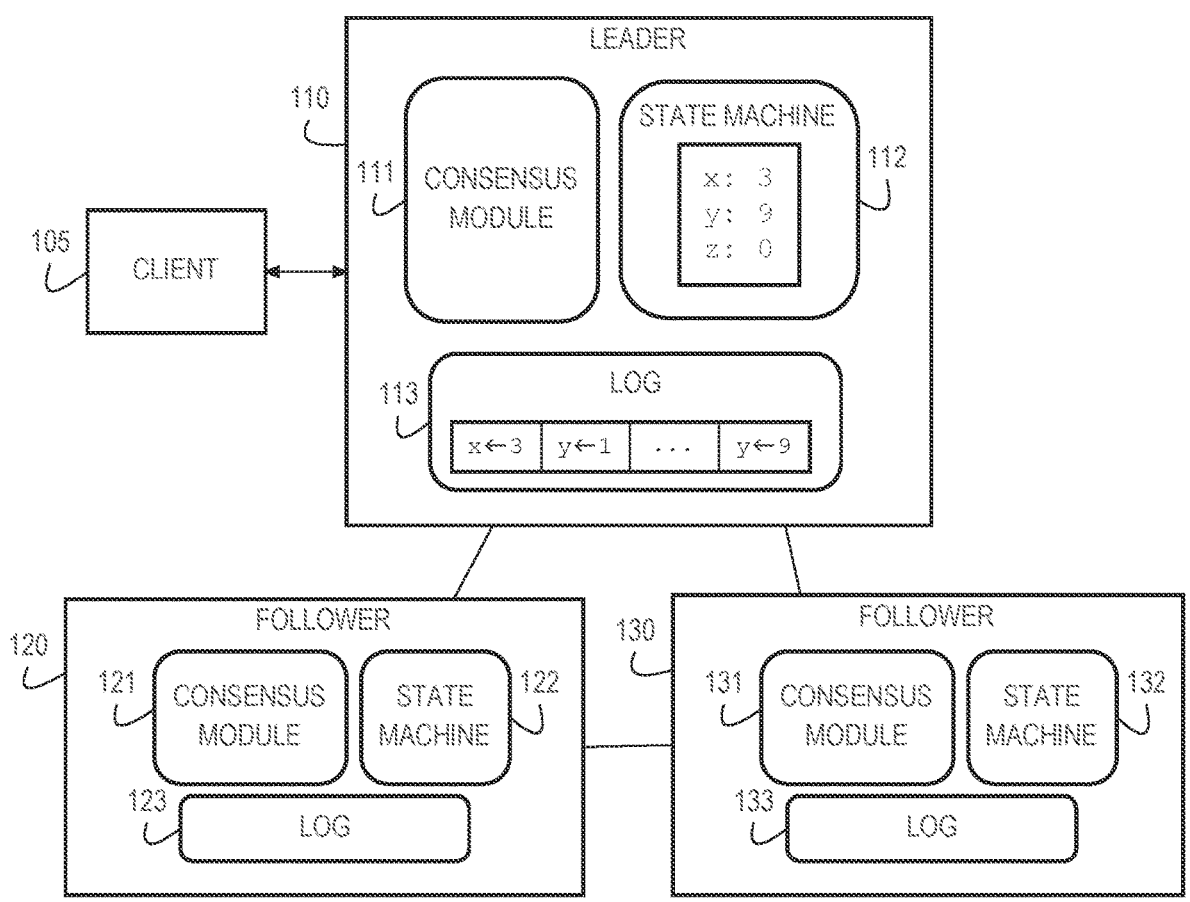
FIG. 1 is a block diagram illustrating a distributed computing system with a state machine replicated across a plurality of servers using a replication log in accordance with a consensus protocol in which aspects of the illustrative embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments provide a consensus protocol with a priority-based leadership election approach. Each server or node in the cluster has an associated priority based on the capabilities and capacities of the servers. In one embodiment, the server with the most resources (e.g., processor cores, memory, etc.) has the highest priority (e.g., priority=1), and the server with the least resources has the lowest priority (e.g., priority=5 for a five-node cluster). The priority values of the servers may be stored in server metadata or a cluster configuration file.

The illustrative embodiments divide the leadership election into two phases: a term increase phase and an election voting phase. In previous consensus protocols, a follower becomes a candidate and increases its term without consulting its peers prior to requesting votes in a leadership election. In accordance with the illustrative embodiments, a candidate sends a message to peers in the cluster to determine whether all peers agree to allow the candidate to increase the term number. If there is no opposition, then the candidate increases the term number and then proceeds to the election voting phase. Each peer determines whether the candidate requesting the term increase has a copy of the log that is up to date. If the copy of the log of the candidate is more advanced than the peer's copy of the log, then the peer agrees to allow the server to increase the term number. If the copy of the log of the candidate is not as advanced as the peer's copy of the log, then the peer opposes the term increase. If the copy of the log of the candidate is equally as advanced as the peer's copy of the log, then the peer approves or opposes the term increase based on a priority comparison. Thus, if the copy of the log of the candidate is equally as advanced as the peer's copy of the log, then the peer approves the term increase if the candidate has a higher priority and opposes the term increase if the peer has a higher priority.

In some embodiments, the candidate sends the term increase request to available servers, as determined by a network monitor. Network monitoring is the use of hardware or software that constantly monitors a computer network for slow or failing components. In accordance with these embodiments, the network monitor captures and analyzes network traffic to determine whether each node in the cluster is available (up) or unavailable (down). In one embodiment, the candidate proceeds to the election voting phase if all available servers approve the term increase.

If the term increase is approved, then the candidate proceeds to the election voting phase. The candidate then votes for itself and sends a vote request to all other servers in the cluster. If votes are received from a majority of the servers, then the candidate becomes leader. Thus, the priority-based leadership election approach of the illustrative embodiments improves efficiency in heterogeneous environments by giving higher priority servers a better opportunity to become leader and also ensures consistency and correctness. Having a higher priority server that is more powerful and more reliable as the leader improves performance. Furthermore, the priority-based leadership election approach of the illustrative embodiments decreases latency of leadership election by preventing split vote scenarios, because only the highest priority server with an up-to-date copy of the log will proceed to the election voting phase.

Raft Protocol

The illustrative embodiments are described with reference to the Raft consensus protocol; however, aspects of the illustrative embodiments can be applied to other consensus protocols, such as Paxos or Zookeeper Atomic Broadcast (ZAB). Raft is a consensus protocol for managing a replicated log. A Raft cluster or group contains several nodes, such as servers. For example, a typical Raft cluster may include five nodes, which allows the system to tolerate two failures. At any given time, each server is in one of three states: leader, follower, or candidate. In normal operation, there is exactly one leader, and all other participant nodes are followers. Followers respond to requests from leaders and candidates. The third state, candidate, is used to elect a new leader. Raft separates the key elements of consensus, such as leader election, log replication, and safety, and enforces a stronger degree of coherency to reduce the number of states that must be considered. The Raft consensus protocol is described in detail in "In Search of an Understandable Consensus Algorithm," by Diego Ongaro et al. published in the Proceedings of USENIX ATC '14:2014 USENIX Annual Technical Conference, Jun. 19-20, 2014, and "Consensus: Bridging Theory and Practice," by Diego Ongaro et al. published by Stanford University, 2014, which are hereby incorporated by reference as if fully set forth herein.

FIG. 1 is a block diagram illustrating a distributed computing system with a state machine replicated across a plurality of servers using a replication log in accordance with a consensus protocol in which aspects of the illustrative embodiments may be implemented. FIG. 1 illustrates a configuration of servers at a particular point in time at which server 110 is the leader and servers 120, 130 are followers. The server that is the leader will change over time; however, in the configuration shown in FIG. 1, server 110 is the current leader.

State machines 112, 122, 132 are replicas of the data being maintained by participant servers 110, 120, 130, respectively. In one embodiment, participant servers 110, 120, 130 may be implementing a DBMS and may manage state machines 112, 122, 132 in the form of tables, objects, documents, etc. For example, participant servers 110, 120, 130 may implement a relational database management system (RDBMS) that manages a collection of tables (or data frames). As another example, participant servers 110, 120, 130 may implement a document DBMS ("DOCS") that manages a collection of JSON objects.

In the example shown in FIG. 1, there is a leader server 110 and two follower servers 120, 130; however, the distributed computing system can include other numbers of servers depending on the configuration or workload. For example, the number of servers in the group of participant nodes can be scaled up or down depending on the workload or other factors that affect resource usage. Consensus protocols typically arise in the context of replicated state machines. As shown in FIG. 1, state machines 112, 122, 132 are replicated across a group of servers 110, 120, 130, respectively. State machines 112, 122, 132 operate to compute the same state and continue to operate even if one or more of the servers 110, 120, 130 are down.

Replicated state machines 112, 122, 132 are implemented using replicated logs. Each server 110, 120, 130 stores a copy of the log 113, 123, 133, respectively, containing a series of commands that are executed in order by its state machine 112, 122, 132. Each copy of the log should contain the same commands in the same order, so each state machine will process the same sequence of commands. Because the state machines 112, 122, 132 are deterministic, each computes the same state and the same sequence of outputs.

Keeping the replicated log consistent is the purpose of the consensus protocol. The consensus module 111 on a leader server 110 receives commands from clients, such as client 101, and adds them to its copy of the log 113. In some embodiment, followers 120, 130 can receive commands from a client (not shown). In one embodiment, when a follower 120, 130 receives an update request from a client, the follower sends a message to leader 110 to update the state machine and generate a log record. The leader returns the result of the command to the follower, which in turn returns the result to the client. In an alternative embodiment, leader 110 handles all client requests, and if a client contacts follower 120 or 130, the follower redirects the client to leader 110.

The consensus module 111 of leader server 110 communicates with the consensus modules 121, 131 of the follower servers 120, 130 to ensure that their logs 123, 133 eventually contain the same requests or commands in the same order, even if one or more nodes fail. Once commands are properly replicated, each server's state machine processes them in log order, and the outputs are returned to the client. As a result, the servers 110, 120, 130 appear to form a single, highly reliable state machine.

The Raft protocol divides time into leadership terms of arbitrary length. Terms are numbered with integers. Each term begins with an election, in which one or more candidates attempt to become leader. Different servers observe the transitions between leadership terms at different times, and in some situations a server may not observe an election or even entire terms. In the Raft protocol, terms act as a logical clock, and they allow servers to detect obsolete information, such as stale leaders. Each node stores a currentTerm number, which increases monotonically over time. Current terms are exchanged whenever servers communicate; if one server's currentTerm value is smaller than another's, then it updates its currentTerm to the larger value. If a candidate or leader discovers that its current term is out of date, then it immediately reverts to the follower state. If a server receives a request with a stale term number, it rejects the request.

In the Raft consensus protocol, servers communicate using remote procedure calls (RPCs), and the consensus protocol requires only two types of RPCs. RequestVote RPCs are initiated by candidates during elections, and AppendEntries RPCs are initiated by leaders to replicate log entries and provide a form of heartbeat. In the Raft protocol, RPCs include a term value as an argument. Any RPC with a term value that is less than the receiving server's currentTerm is rejected. This ensures that only AppendEntries RPCs from the current leader are accepted in the current term.

Raft uses a heartbeat mechanism to trigger a leader election. When nodes start up, they begin as followers. A node remains in follower state as long as it receives valid RPCs from a leader or candidate. Leaders send periodic heartbeats (e.g., AppendEntries RPCs that carry no log entries) to all followers to maintain their authority. If a follower receives no communication over a period of time, then it assumes there is no viable leader and begins an election to choose a new leader. A candidate wins an election if it receives votes from a majority, or consensus, of the nodes in the full group for the same term. The majority rule ensures that at most one candidate can win the election for a particular term. Once a candidate wins an election, it becomes leader. It then sends heartbeat messages to the other nodes to establish its authority and prevent new elections.

A candidate begins an election by incrementing its currentTerm, voting for itself, and sending a RequestVote RPC to the other servers in the cluster. The RequestVote RPC has as arguments a term set to the candidate's incremented currentTerm, a candidateID of the candidate requesting the vote, a lastLogIndex representing the index of the candidate's last log entry, and a lastLogTerm representing the term value for the candidate's last log entry. Each other server uses these arguments to determine whether to vote for the candidate as the leader. If the term and copy of the log of the candidate are at least as up to date as the server, then the server grants the vote; otherwise, the server denies the vote (responds false).

This results in a protocol in which any server with an up-to-date copy of the log has an equal opportunity to win an election for leadership. In such a situation, the first server to convert to candidate and request a vote often wins the election. However, in a heterogeneous computing environment, not all servers have equal resources or capacity. It may be desirable for a server with more processing resources, memory, or network bandwidth to become the leader.

Furthermore, while split votes are rare due to a randomized election timeout, it is still possible for more than one server to initiate an election and receive votes. For example, consider a cluster with five servers (S1, S2, S3, S4, S5) with server S1 as the leader. If S1 fails, then S2 and S4 can both request a vote with server S2 voting for itself and receiving a vote from S3, and server S4 voting for itself and receiving a vote from S5. When this happens, neither candidate will receive a majority vote; therefore, each candidate will time out and start a new election by incrementing its term and initiating another round of voting.

Heterogeneous Nodes

Figures 2A, 2B, 2C:
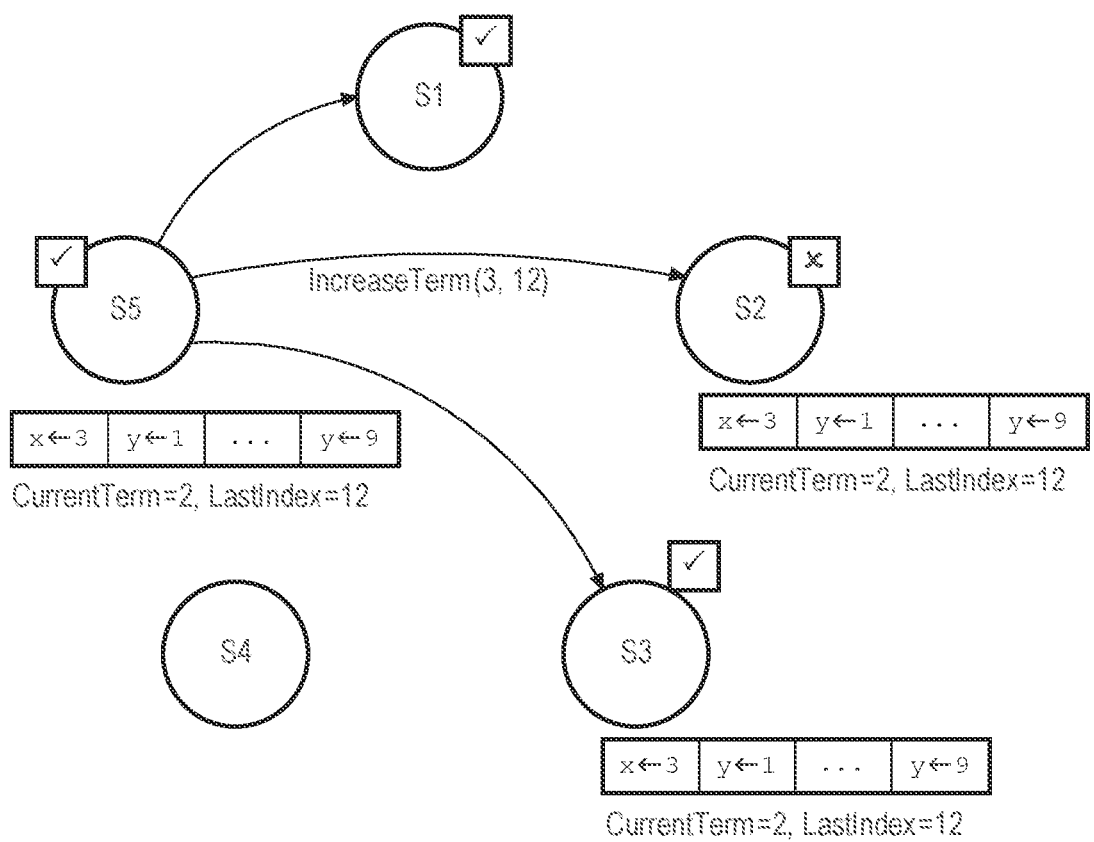
FIG. 2A illustrates aspects of a leadership election in a distributed computing system with heterogeneous servers in accordance with an illustrative embodiment.
FIG. 2B is a table illustrating assigned priorities for servers in a heterogeneous computing environment in accordance with an illustrative embodiment.
FIG. 2C is a table illustrating server status as determined by a network monitor in accordance with an illustrative embodiment.

The illustrative embodiments provide a leadership election in a consensus protocol for a replication cluster having heterogeneous nodes. FIG. 2A illustrates aspects of a leadership election in a distributed computing system with heterogeneous servers in accordance with an illustrative embodiment. In the depicted example, the replication cluster includes five servers (S1, S2, S3, S4, S5) having different resources and capacity. For example, S1 may have 10 processing cores, S2 may have 5 processing cores, S5 may have 3 processing cores, S3 may have 2 processing cores, and S4 may have 1 processing core. Thus, the servers may be assigned the following priority order: S1, S2, S5, S3, S4. FIG. 2B is a table illustrating assigned priorities for servers in a heterogeneous computing environment in accordance with an illustrative embodiment.

In one embodiment, server priorities may be stored in server metadata within the consensus protocol. For example, each server may store its priority in association with its currentTerm and replication log. Alternatively, server priorities may be stored in the cluster configuration, which is used to maintain the servers that are participating in the consensus algorithm. For instance, the cluster configuration may store a member identifier and priority for each server in the cluster.

In the example shown in FIG. 2B, a lower priority value indicates a "higher" priority, e.g., the server with priority=1 is the highest priority server. Alternatively, a different convention could be used where a server with priority=2 has a higher priority than a server with priority=1. In some embodiments, the priority may be categorical, e.g., high, medium, low. In such embodiments, it may be possible for more than one server to have the same priority category or value. In these cases, there may be a tie breaker, such granting a vote for a candidate with the same priority, as will be discussed in further detail below.

In the example described above, the resource is processing cores; however, other resources may be used to determine priority, such as memory, network bandwidth, etc. In some embodiments, an administrator can assign priorities based on other criteria not related to computing resources. For example, priorities may be assigned based on proximity to clients.

The aspects of the invention may also apply to homogeneous computing environments. For example, priorities may be assigned to ensure that certain computers have higher priority and have a greater chance to become leader for cache affinity.

Network Monitoring

In the Raft consensus protocol, each server assumes the other servers are operational until the election timeout expires before a follower receives a heartbeat from the leader. If the leader sends a RequestVote or AppendEntries RPC to a failed follower, the leader will retry the RPC indefinitely assuming the follower will eventually restart. In accordance with some embodiments, a network monitor captures and analyzes network traffic to determine whether each node in the cluster is available (up) or unavailable (down). In the leadership election of the illustrative embodiments, a candidate uses the status of each server, as determined by the network monitor, to send messages to available.

Network monitoring is the use of a system that constantly monitors a computer network for slow or failing components. Network monitoring attempts to anticipate problems caused by overloaded or crashed servers, network connections, or other devices. Commonly measured metrics are response time, availability, and uptime, although both consistency and reliability metrics are starting to gain popularity. FIG. 2C is a table illustrating server status as determined by a network monitor in accordance with an illustrative embodiment. In the depicted example, servers S1, S2, S3, S5 are available (up), and server S4 is unavailable (down).

Term Increase Phase

In accordance with an illustrative embodiment, when a follower experiences an election timeout without receiving a heartbeat from the leader, the follower initiates a term increase phase of the leadership election. Returning to FIG. 2A, server S5 experiences an election timeout and begins the term increase phase by converting to candidate and sending a term increase request (e.g., a TermIncreaseRequest RPC) to all available servers in the cluster. Based on the server status from the table in FIG. 2C, server S5 sends the term increase request to servers S1, S2, and S3, but not to server S4, because S4 is down.

If the candidate receives a unanimous vote to increase the term, then the candidate increases its currentTerm and proceeds to the election voting phase of the leadership election. If at least one server denies the term increase request, then the candidate reverts to follower state. In one embodiment, the candidate votes for itself for the term increase; however, because a term increase requires a unanimous vote rather than a majority or consensus, the candidate's own vote is irrelevant and can be ignored. Thus, in an alternate embodiment, the candidate can determine whether the term increase is approved by considering the votes of all available servers other than the candidate.

Each peer in the cluster receiving the term increase request (S1, S2, S3) determines whether to approve or deny the term increase based on arguments of the request. In one embodiment, the TermIncreaseRequest RPC has the following arguments:
- term: the value to which the candidate requests to increase the term (e.g., the candidate's currentTerm+1 (3 in the example shown in FIG. 2A);
- candidateId: the identifier of the candidate;
- lastLogIndex: the index of the candidate's last log entry (12 in the example shown in FIG. 2A);
- lastLogTerm: the term of the candidate's last log entry.

In one embodiment, the TermIncreaseRequest RPC includes as an argument the candidate's currentTerm (e.g., 2) as the term, and each peer determines whether the candidate's currentTerm is as up to date as the peer's currentTerm, knowing that the increase the currentTerm if the request is approved. In another embodiment, the TermIncreaseRequest RPC includes as arguments the currentTerm of the candidate (e.g., 2) and the term value (e.g., 3) to which the candidate is requesting to increase the term.

Note that the term value and the lastLogTerm value may be different if the candidate has voted in one or more elections since applying the last AppendEntries RPC to the log.

The peer server considers whether the candidate's copy of the log is up to date relative to the peer server's own copy of the log. More specifically, the peer server compares the lastLogIndex argument to the peer server's own copy of the log to determine whether the candidate's copy of the log is up to date. In one embodiment, the peer server also considers the lastLogTerm argument to determine whether the candidate's copy of the log is up to date. In one embodiment, the peer server determines whether the term argument advances the term relative to the peer server's currentTerm.

If the candidate server's copy of the log is more advanced than the peer server's copy of the log, then the peer server approves the term increase request. In this case, the peer server determines that the candidate is a better candidate for leadership because the candidate has a more advanced log. If the peer server's copy of the log is more advanced than the candidate server's copy of the log, then the peer server denies the term increase request. In this case, the peer server determines that it is a better candidate for leadership and that it would deny the vote for the candidate in an election for leadership. In some embodiments, the peer server approves the term increase by responding with a value of true and denies the term increase by responding with a value of false.

If the candidate's copy of the log and peer server's copy of the log are equally as advanced, based on the values for lastLogIndex and lastLogTerm, then the peer server determines whether to approve the term increase based on a priority comparison. In the example shown in FIG. 2A, servers S2 and S3 have logs that are as up to date as server S5. Server S2 has a higher priority than server S5 and denies the term increase request. Server S3 has a lower priority than server S5 and approves the term increase request.

In the depicted example, server S1 also approves the term increase request. In one scenario, server S1 approves the term increase request because its copy of the log is not as up to date as server S5's copy of the log. Because server S1 has a higher priority than server S5, server S1 will not approve the term increase request if the logs are equally as up to date.

If candidate server S2 had received unanimous approval, then server S2 would have proceeded to the election voting phase of the leadership election process. However, candidate server S5 receives a denial from server S2. Because the candidate server S5 does not receive unanimous approval, server S5 reverts back to follower.

Subsequently, server S2 may initiate the term increase request phase of leadership election. FIG. 2D illustrates a successful term increase phase of a leadership election in a distributed computing system with heterogeneous servers in accordance with an illustrative embodiment. If server S1, the only higher priority server, is not as up to date as the other servers, then server S2 would receive unanimous approval for the term increase phase. Thus, server S2 would proceed to the election voting phase of the leadership election process.

Because server S1's copy of the log is not as up to date as the other available servers, it can be assumed that server S1 was not the leader. In one scenario, server S4 was the server and failed, as indicated by the network monitor status in FIG. 2C. In another scenario, server S2 is the leader, and server S5 did not receive a heartbeat message from server S2 because of a temporary network issue. In this case, server S2 remains as leader.

In yet another scenario, server S3 is the leader, and server S5 did not receive a heartbeat message from server S2 because of a temporary network issue. In this case, server S5 does not become leader because it has a lower priority; however, server S2 could become leader. This provides an opportunity for a higher priority server to become leader even if the leader does not fail. If the leader becomes overburdened due to a lack of resources or capacity and fails to send a heartbeat message, a higher priority server can take over as leader using the priority-based two-phase leadership election process of the illustrative embodiments.

Election Voting Phase

If a candidate server receives unanimous approval for a term increase, then the candidate increases its currentTerm and proceeds to the election voting phase. In the election voting phase, the candidate server votes for itself, resets the election timer, and sends a RequestVote RPC to all other servers. In accordance with the illustrative embodiments, the candidate sends the RequestVote RPC to all servers regardless of whether they are determined to be available. In some embodiments, the candidate may send the RequestVote RPC to only the available servers; however, the election will be determined by a consensus, or a majority, of the servers of the cluster, including the unavailable servers. Thus, in the example shown in FIG. 2E, if a candidate, such as server S2 proceeds to the election voting phase, then server S2 would need a vote granted from a majority of servers S1, S2, S3, S4, S5. Because the candidate S2 votes for itself, the candidate would need at least two other votes to become leader. Even if server S4 is down, whether the RequestVote RPC is sent to server S4 or not, the candidate S2 would need votes from two or more of servers S1, S3, S5 to become leader.

If votes are received from a majority of servers, the candidate becomes leader. If an AppendEntries RPC is received from a new leader during the election voting phase, then the candidate converts to follower. If the election timeout elapses, then the candidate starts a new election. In one embodiment, starting a new election involves repeating the term increase phase; however, in an alternative embodiment, if the election timeout elapses, the candidate simply restarts the election voting phase.

Procedural Overview

FIG. 3 is a flowchart illustrating operation of a server performing a leadership election in accordance with an illustrative embodiment. Operation begins when the server experiences an election timeout without receiving a heartbeat from a leader (block 300). The server converts to candidate (block 301) and sends a term increase request to the available servers in the cluster (block 302). As described above, the server may send the term increase request to only those servers in the cluster that a network monitor determines to be available.

In one embodiment, the candidate server also votes for itself (block 303). Because a term increase requires a unanimous vote and the candidate will always vote for itself, this step is optional. The candidate can determine whether it receives unanimous approval from the other available servers in the cluster.

The candidate server then receives votes (block 304) and determines whether it has received unanimous approval among the votes (block 305). If the candidate does not receive unanimous approval (block 305: NO), then the candidate converts to follower (block 306) and operation ends (block 307). At least one other server has determined that the candidate is not the best server to be leader, either because the candidate does not an have up-to-date copy of the log or because a server with a higher priority is a better candidate to be leader.

If the candidate receives unanimous approval (block 305: YES), then the candidate increases its current term (block 308). The candidate then proceeds to perform the election voting phase of the leadership election (block 309). Thereafter, operation ends (block 307). The election voting phase is similar to the leadership election of prior consensus protocols. Thus, similar to the Raft consensus protocol, the candidate, having increased its current term, votes for itself, resets an election timer, and sends a RequestVote RPC to all other servers. If the candidate receives votes from a majority of servers, then the candidate becomes leader. If an AppendEntries RPC is received from a new leader, then the candidate converts to follower. If the election timeout elapses, then the candidate starts a new election or, alternatively, restarts the election voting phase of the leadership election.

Figure 4:
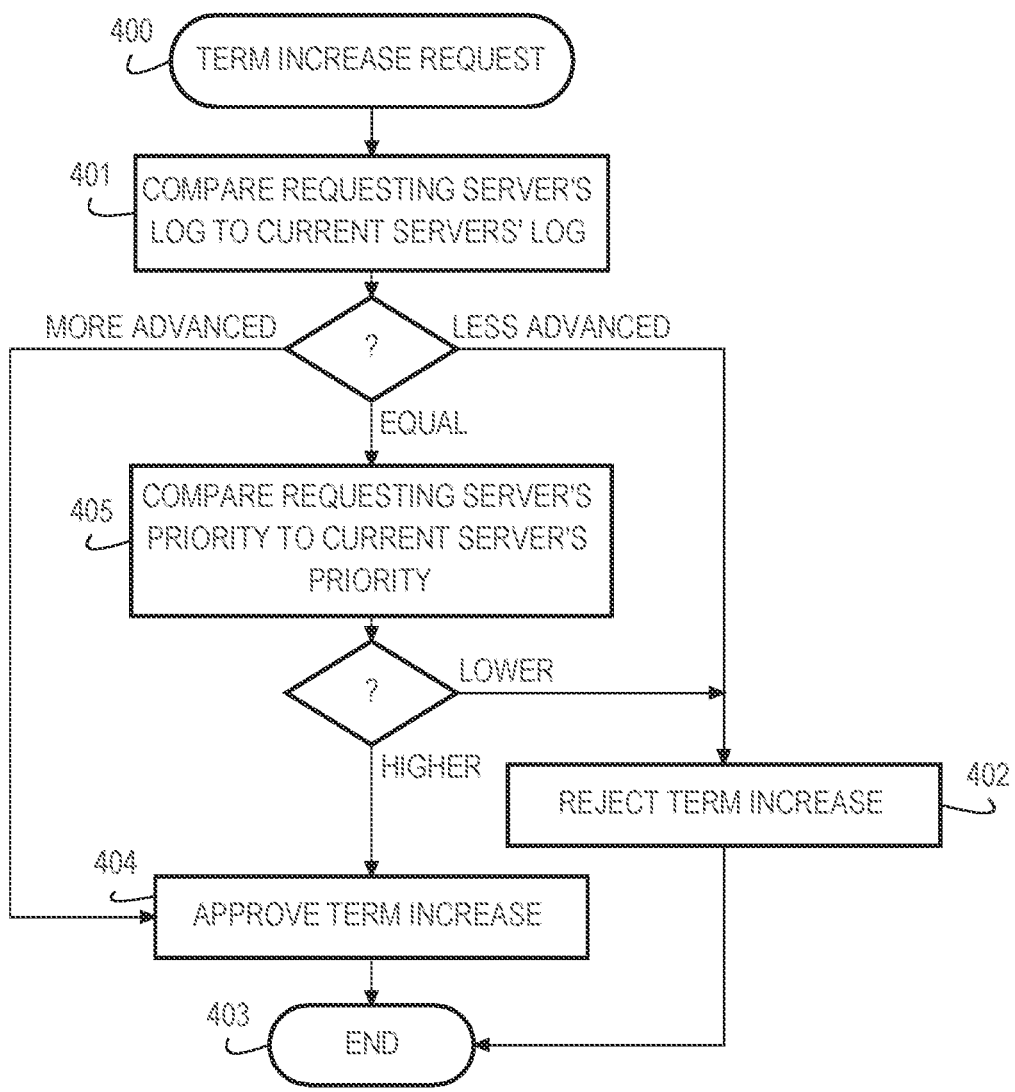
FIG. 4 is a flowchart illustrating operation of a peer server processing a term increase request in accordance with an illustrative embodiment.
Figure 5:
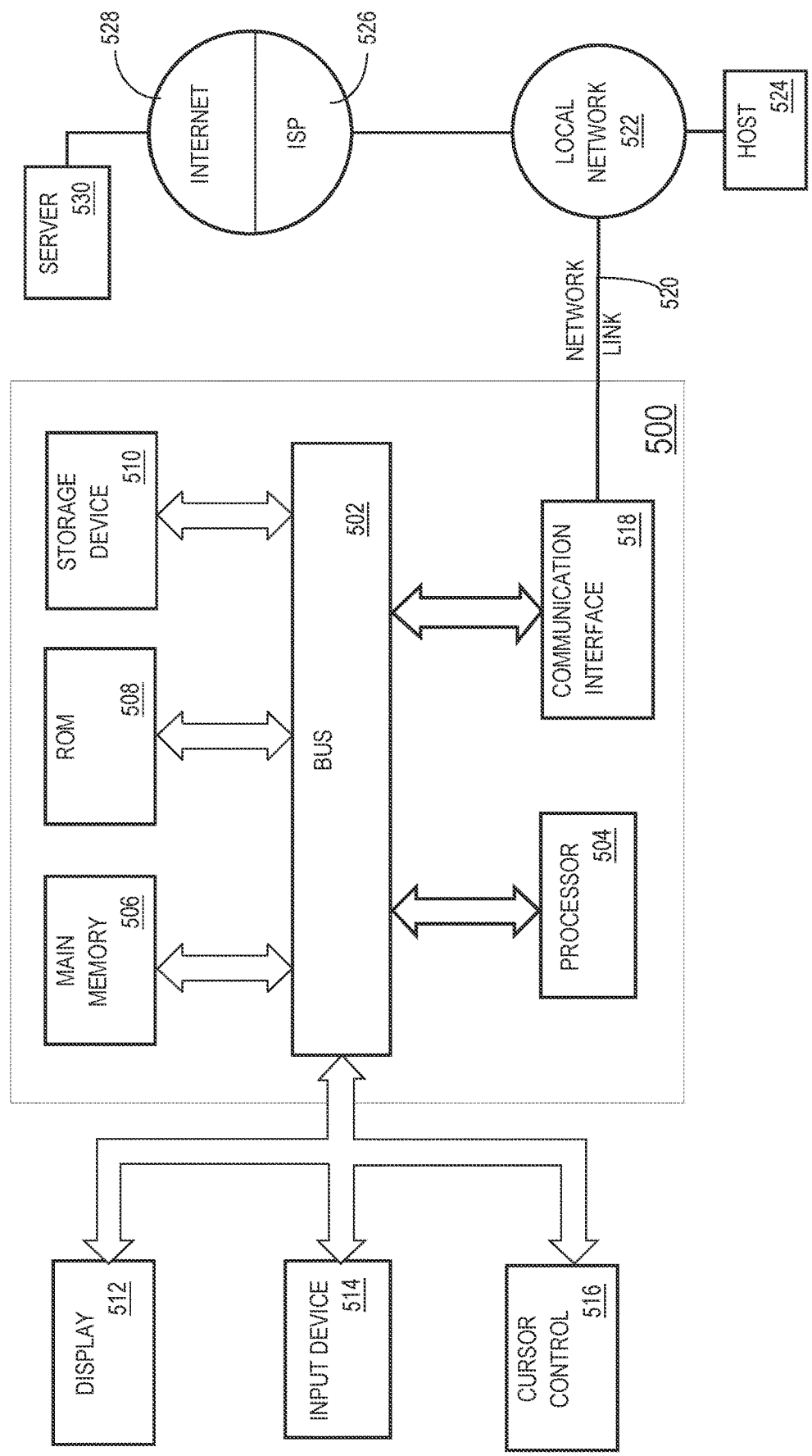
FIG. 5 is a block diagram that illustrates a computer system upon which an embodiment of the invention may be implemented.
Figure 6:
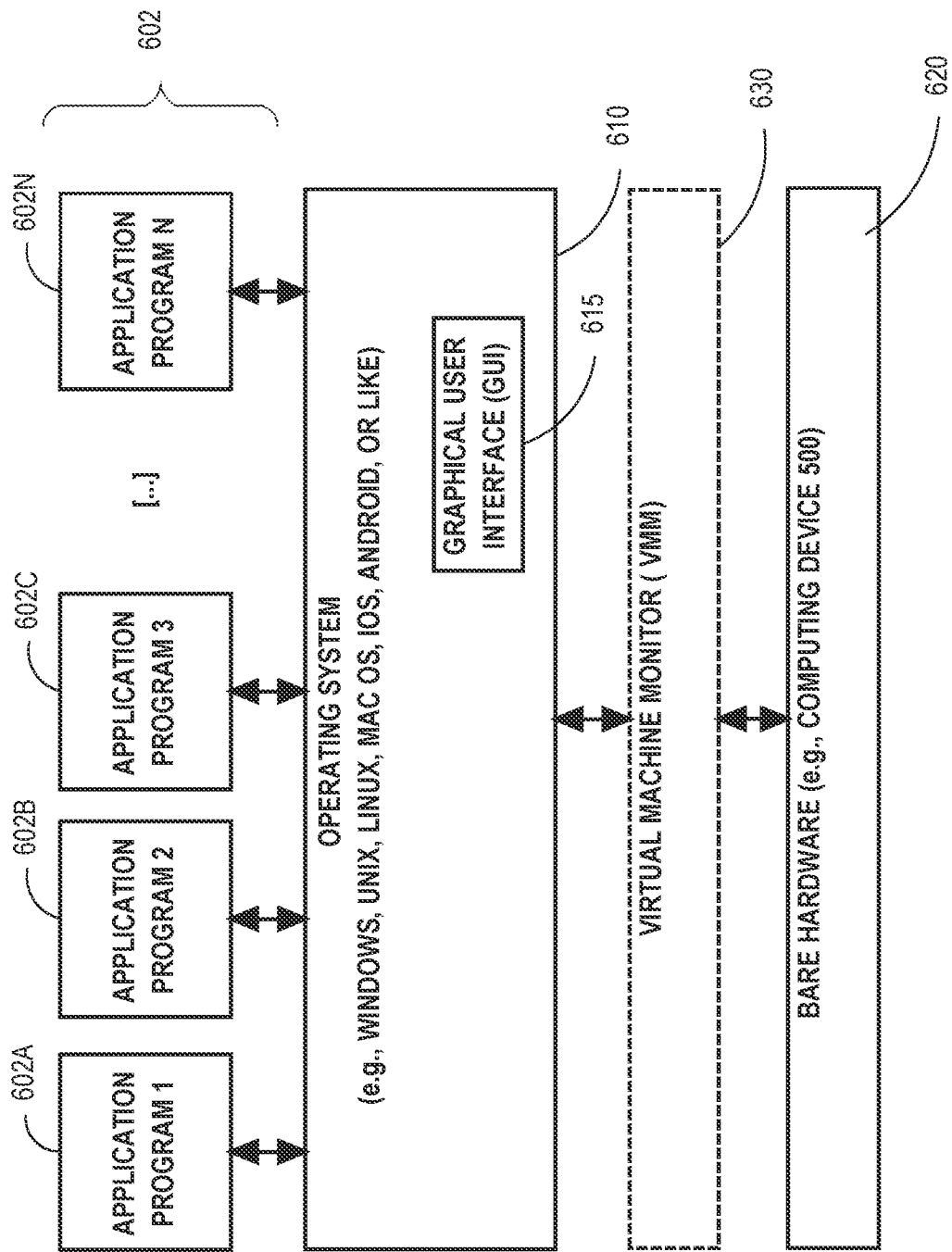
FIG. 6 is a block diagram of a basic software system that may be employed for controlling the operation of a computer system.

FIG. 4 is a flowchart illustrating operation of a peer server processing a term increase request in accordance with an illustrative embodiment. Operation begins when a peer server receives a term increase request (block 400). The peer server compares the requesting server's copy of the log to its own copy of the log (block 401). In one embodiment, the peer server determines whether the lastLogIndex of the requesting server's copy of the log is as advanced as the last log index of the peer server's copy of the log. In addition, the peer server may determine whether the lastLogTerm of the requesting server's copy of the log is as advanced as the last log term of the peer server's copy of the log. In another embodiment, the peer server determines whether the current term is advanced as the peer server's own current term. In another embodiment, the peer server determines whether the term value to which the requesting server is requesting to increase the term is greater than the peer server's current term. Thus, if the requesting server is requesting to advance the term to 3, but the currentTerm of the peer server is already 3, then the peer server may determine that the requesting server is not as advanced.

If the requesting server's copy of the log is less advanced than the peer server's copy of the log, then the peer server rejects the term increase (block 402). Thereafter, operation ends (block 403). If the requesting server's copy of the log is more advanced than the peer server's copy of the log, then the peer server approves the term increase (block 404). Thereafter, operation ends (block 403).

If the requesting server's copy of the log and the peer server's copy of the log are equally as advanced, then the peer server compares the requesting server's priority to the current server's priority (block 405). If the requesting server's priority is less than the peer server's priority, then the peer server rejects the term increase (block 402), and operation ends (block 403). If the requesting server's priority is higher than the peer server's priority, then the peer server approves the term increase (block 404), and operation ends (block 403).

In embodiments where servers can have the same priority value, then the peer server approves the term increase in response to the requesting server and the peer server having the same priority. That is, the peer server only rejects the term increase if the peer server is a better candidate for leadership due to having a more advanced copy of the log or a higher priority.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world-wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

FIG. 9 is a block diagram of a basic software system 900 that may be employed for controlling the operation of computer system 900. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
in response to an election timeout, sending a term increase request from a particular server in a replication group of servers to two or more available servers in the replication group of servers, wherein:
each server within the replication group of servers stores a respective copy of a log, and
the term increase request specifies a requested term value and a last index of the copy of the log at the particular server; and
determining, by the particular server, whether to increase a current term value of the particular server to the requested term value and request a leadership election based on responses received from the two or more available servers, wherein:
each server in the replication group of servers has a corresponding priority value, and
each of the two or more available servers determines whether to approve the term increase request based on one or more of: the requested term value, the last index of the copy of the log at the particular server, or the priority of the particular server,
wherein the method is performed by one or more computing devices.

2. The method of claim 1, wherein the particular server increases the current term value to the requested term value and requests the leadership election in response to unanimous approval from the two or more available servers.

3. The method of claim 1, wherein each given server within the two or more available servers determines whether to approve the term increase request by:
comparing the requested term value to a current term value of the given server; and
in response to the requested term value being less than or equal to the current term value of the given server, denying the term increase request.

4. The method of claim 1, wherein each given server within the two or more available servers determines whether to approve the term increase request by:
comparing the last index of the copy of the log at the particular server to a last index of the copy of the log at the given server; and
in response to the last index of the copy of the log at the particular server being less than the last index of the copy of the log at the given server, denying the term increase request.

5. The method of claim 1, wherein each given server within the two or more available servers determines whether to approve the term increase request by:
comparing the last index of the copy of the log at the particular server to a last index of the copy of the log at the given server; and
in response to the last index of the copy of the log at the particular server being greater than the last index of the copy of the log at the given server, approving the term increase request.

6. The method of claim 1, wherein each given server within the two or more available servers determines whether to approve the term increase request by:
comparing the last index of the copy of the log at the particular server to a last index of the copy of the log at the given server;
in response to the last index of the copy of the log at the particular server being equal to the last index of the copy of the log at the given server, comparing the priority of the particular server to the priority of the given server; and
in response to the priority of the particular server being greater than or equal to the priority of the given server, approving the term increase request.

7. The method of claim 1, wherein each given server within the two or more available servers determines whether to approve the term increase request by:
comparing the last index of the copy of the log at the particular server to a last index of the copy of the log at the given server;
in response to the last index of the copy of the log at the particular server being equal to the last index of the copy of the log at the given server, comparing the priority of the particular server to the priority of the given server; and
in response to the priority of the particular server being less than the priority of the given server, denying the term increase request.

8. The method of claim 1, wherein a network monitor monitors each server within the replication group of servers to determine whether each server is available.

9. The method of claim 8, wherein the two or more available servers are all available servers in the replication group of servers.

10. A method comprising:
receiving, by a particular server in a replication group of servers, a term increase request from a requesting server in the replication group of servers, wherein:
each server within the replication group of servers stores a respective copy of a log,
each server in the replication group of servers has a corresponding priority value, and
the term increase request specifies a requested term value and a last index of the copy of the log at the requesting server; and
determining, by the particular server, whether to approve or deny the term increase request based on one or more of: a comparison of the requested term value and a current term value at the particular server, a comparison of the last index of the copy of the log at the requesting server and a last index of the copy of the log at the particular server, or a comparison of the priority of requesting server and the priority of the particular server,
wherein the method is performed by one or more computing devices.

11. The method of claim 10, wherein the particular server determines whether to approve the term increase request by:
comparing the requested term value to the current term value of the particular server; and in response to the requested term value being less than or equal to the current term value of the particular server, denying the term increase request.

12. The method of claim 10, wherein the particular server determines whether to approve the term increase request by:
   comparing the last index of the copy of the log at the requesting server to the last index of the copy of the log at the particular server; and
   in response to the last index of the copy of the log at the requesting server being less than the last index of the copy of the log at the particular server, denying the term increase request.

13. The method of claim 10, wherein the particular server determines whether to approve the term increase request by:
   comparing the last index of the copy of the log at the requesting server to the last index of the copy of the log at the particular server; and
   in response to the last index of the copy of the log at the requesting server being greater than the last index of the copy of the log at the particular server, approving the term increase request.

14. The method of claim 10, wherein the particular server determines whether to approve the term increase request by:
   comparing the last index of the copy of the log at the requesting server to the last index of the copy of the log at the particular server;
   in response to the last index of the copy of the log at the requesting server being equal to the last index of the copy of the log at the particular server, comparing the priority of the requesting server to the priority of the particular server; and
   in response to the priority of the requesting server being greater than or equal to the priority of the particular server, approving the term increase request.

15. The method of claim 10, wherein the particular server determines whether to approve the term increase request by:
   comparing the last index of the copy of the log at the requesting server to the last index of the copy of the log at the particular server;
   in response to the last index of the copy of the log at the requesting server being less than the last index of the copy of the log at the particular server, comparing the priority of the requesting server to the priority of the particular server; and
   in response to the priority of the requesting server being less than the priority of the particular server, denying the term increase request.

16. One or more non-transitory storage media storing instructions which, when executed by one or more computing devices, cause:
   in response to an election timeout, sending a term increase request from a particular server in a replication group of servers to two or more available servers in the replication group of servers, wherein:
      each server within the replication group of servers stores a respective copy of a log, and
      the term increase request specifies a requested term value and a last index of the copy of the log at the particular server; and
   determining, by the particular server, whether to increase a current term value of the particular server to the requested term value and request a leadership election based on responses received from the two or more available servers, wherein:
      each server in the replication group of servers has a corresponding priority value,
      each of the two or more available servers determines whether to approve the term increase request based on one or more of: the requested term value, the last index of the copy of the log at the particular server, or the priority of the particular server.

17. The one or more non-transitory storage media of claim 16, wherein the particular server increases the current term value to the requested term value and requests the leadership election in response to unanimous approval from the two or more available servers.

18. The one or more non-transitory storage media of claim 16, wherein a network monitor monitors each server within the replication group of servers to determine whether each server is available.

19. The one or more non-transitory storage media of claim 18, wherein the two or more available servers are all available servers in the replication group of servers.

20. The one or more non-transitory storage media of claim 16, wherein each given server within the two or more available servers determines whether to approve the term increase request by:
   comparing the requested term value to a current term value of the given server; and
   in response to the requested term value being less than or equal to the current term value of the given server, denying the term increase request.

21. The one or more non-transitory storage media of claim 16, wherein each given server within the two or more available servers determines whether to approve the term increase request by:
   comparing the last index of the copy of the log at the particular server to a last index of the copy of the log at the given server; and
   in response to the last index of the copy of the log at the particular server being less than the last index of the copy of the log at the given server, denying the term increase request.

22. The one or more non-transitory storage media of claim 16, wherein each given server within the two or more available servers determines whether to approve the term increase request by:
   comparing the last index of the copy of the log at the particular server to a last index of the copy of the log at the given server; and
   in response to the last index of the copy of the log at the particular server being greater than the last index of the copy of the log at the given server, approving the term increase request.

23. The one or more non-transitory storage media of claim 16, wherein each given server within the two or more available servers determines whether to approve the term increase request by:
   comparing the last index of the copy of the log at the particular server to a last index of the copy of the log at the given server;
   in response to the last index of the copy of the log at the particular server being equal to the last index of the copy of the log at the given server, comparing the priority of the particular server to the priority of the given server; and
   in response to the priority of the particular server being greater than or equal to the priority of the given server, approving the term increase request.

24. The one or more non-transitory storage media of claim 16, wherein each given server within the two or more available servers determines whether to approve the term increase request by:

comparing the last index of the copy of the log at the particular server to a last index of the copy of the log at the given server;

in response to the last index of the copy of the log at the particular server being equal to the last index of the copy of the log at the given server, comparing the priority of the particular server to the priority of the given server; and in response to the priority of the particular server being less than the priority of the given server, denying the term increase request.

25. One or more non-transitory storage media storing instructions which, when executed by one or more computing devices, cause:

receiving, by a particular server in a replication group of servers, a term increase request from a requesting server in the replication group of servers, wherein:

each server within the replication group of servers stores a respective copy of a log, each server in the replication group of servers has a corresponding priority value, and the term increase request specifies a requested term value and a last index of the copy of the log at the requesting server; and determining, by the particular server, whether to approve or deny the term increase request based on one or more of: a comparison of the requested term value and a current term value at the particular server, a comparison of the last index of the copy of the log at the requesting server and a last index of the copy of the log at the particular server, or a comparison of the priority of requesting server and the priority of the particular server.

26. The one or more non-transitory storage media of claim 25, wherein the particular server determines whether to approve the term increase request by:

comparing the requested term value to the current term value of the particular server; and in response to the requested term value being less than or equal to the current term value of the particular server, denying the term increase request.

27. The one or more non-transitory storage media of claim 25, wherein the particular server determines whether to approve the term increase request by:

comparing the last index of the copy of the log at the requesting server to the last index of the copy of the log at the particular server; and in response to the last index of the copy of the log at the requesting server being less than the last index of the copy of the log at the particular server, denying the term increase request.

28. The one or more non-transitory storage media of claim 25, wherein the particular server determines whether to approve the term increase request by:

comparing the last index of the copy of the log at the requesting server to the last index of the copy of the log at the particular server; and in response to the last index of the copy of the log at the requesting server being greater than the last index of the copy of the log at the particular server, approving the term increase request.

29. The one or more non-transitory storage media of claim 25, wherein the particular server determines whether to approve the term increase request by:

comparing the last index of the copy of the log at the requesting server to the last index of the copy of the log at the particular server;

in response to the last index of the copy of the log at the requesting server being equal to the last index of the copy of the log at the particular server, comparing the priority of the requesting server to the priority of the particular server; and in response to the priority of the requesting server being greater than or equal to the priority of the particular server, approving the term increase request.

30. The one or more non-transitory storage media of claim 25, wherein the particular server determines whether to approve the term increase request by:

comparing the last index of the copy of the log at the requesting server to the last index of the copy of the log at the particular server;

in response to the last index of the copy of the log at the requesting server being less than the last index of the copy of the log at the particular server, comparing the priority of the requesting server to the priority of the particular server; and in response to the priority of the requesting server being less than the priority of the particular server, denying the term increase request.

* * * * *